Patented Nov. 3, 1925.

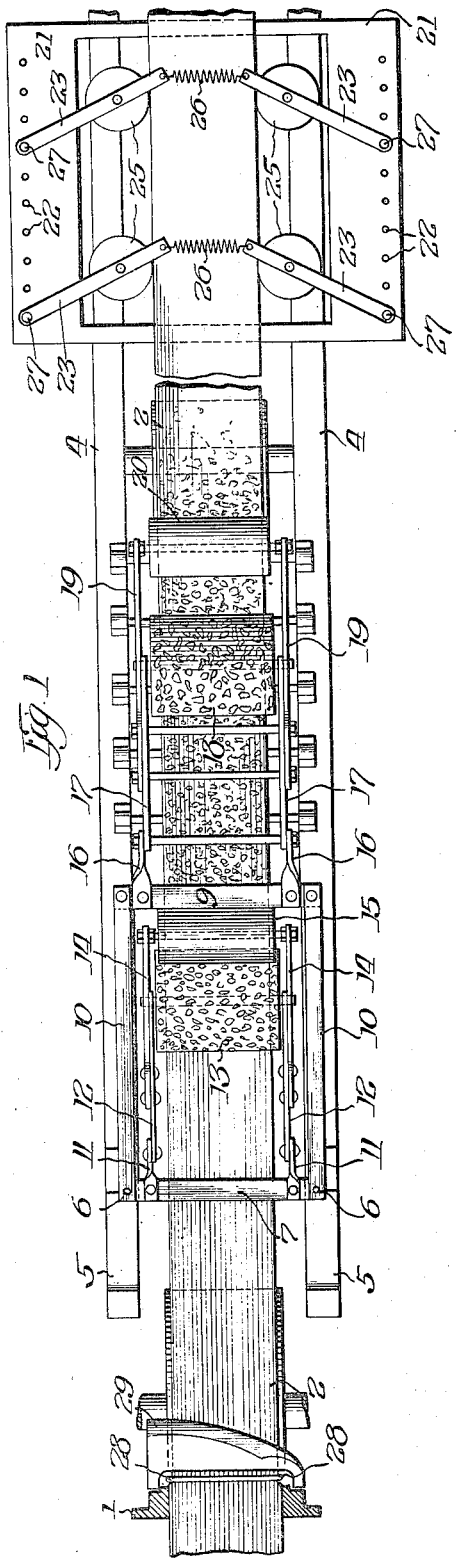

1,559,948

UNITED STATES PATENT OFFICE.

PORTER C. FARRIS, OF BRAZIL, INDIANA, ASSIGNOR TO HYDRAULIC-PRESS BRICK COMPANY, OF ST. LOUIS, MISSOURI, A CORPORATION OF MISSOURI.

MEANS FOR AND METHOD OF MAKING ORNAMENTAL BRICK.

Application filed July 27, 1923. Serial No. 654,120.

*To all whom it may concern:*

Be it known that I, PORTER C. FARRIS, a citizen of the United States, residing at Brazil, in the county of Clay and State of Indiana, have invented a certain new and useful Means for and Method of Making Ornamental Brick, of which the following is a full, clear, concise, and exact description, reference being had to the accompanying drawings, forming a part of this specification.

The present invention relates to the manufacture of brick with ornamental faces. In the commonly used method of manufacturing ornamental faced brick pieces of clay are torn from the surface of the clay slab which is to be cut into bricks and then the separated pieces of clay are pressed back onto the slab in irregular form. This method has not served to produce satisfactory brick and has proved to be uncertain and wasteful because, among other reasons, the particles of clay torn from the slab often will not again adhere to the slab. The principal object of the present invention is the provision of a method and means for making ornamental faced brick without tearing particles from the clay slab and pressing the particles back onto the surface of the slab.

In the drawings, which illustrate a preferred embodiment of the invention,—

Figure 1 is a top plan view of mechanism for ornamenting the faces of a clay slab which is to be cut into bricks.

Figure 2 is a side elevation thereof.

The mechanism for ornamenting the faces of the slab may be used in conjunction with a so-called stiff-mud brick machine 1, the forward end of which is a die through which the clay slab 2 is continuously projected. The slab may be supported and carried forward by a conveyor 3 and after its surfaces have been ornamented the slab may be advanced to any desired form of device for cutting the slab into bricks.

The frame of the machine includes channel bars 4 to the rear ends of which laterally spaced brackets 5 are secured. Upright bars 6 are secured to the brackets 5 and their upper ends are connected by a cross bar 7. A pair of upright bars 8 are secured to the channel bars 4 forwardly of the bars 6 and their upper ends are connected by a cross bar 9, the bars 7 and 9 being connected by side bars 10. Forwardly projecting brackets 11 are fixed to opposite ends of cross bar 7 and the bars 12 are pivoted at their upper ends to the respective brackets 11. A roller 13 is journaled in the lower ends of the bars 12 and is formed with any desired ornamenting surface. The roller 13 is designed to ornament the upper face of the clay slab 2. In order that the roller may bear upon the clay slab with any desired pressure, arms 14 are secured to the arms 12 and at their outer ends a weight 15 may be supported. The weight 15 may be changed to conform to various conditions and desires. Brackets 16 project forwardly from the cross bar 9 and to each bracket is pivoted the upper end of a bar 17 carrying an ornamenting roller 18, arms 19 and a weight 20, for further ornamenting the clay slab after it has passed the roller 13.

Forwardly of the rollers 13 and 18 the frame of the machine is provided with oppositely extending plates 21 formed with a plurality of holes 22. A pair of shafts 27 are journaled in selected holes 22 at opposite sides of the path of the clay slab and preferably a second pair of shafts 27 are journaled in holes forward of the first pair. Each of the shafts carries vertically spaced bars 23 and 24 carrying a roller 25, the opposite bars 23 and 24 being connected by springs 26 which press the rollers 25 against the sides of the clay slab to ornament its surfaces.

At the rear end of the machine, just forwardly of the die of the brick machine, 1, a wire 28 extends across the top and down the sides of the path of the clay slab. The opening formed by the wire 28 is only slightly smaller than the opening through the die of the brick machine, the purpose of the wire 28 being to remove the smooth surface of the slab formed by passage of the clay through the die. A bar 29 extends over the top of the clay slab just forwardly of the wire 28 to carry off the clay removed from the top of the slab by the wire 28, the clay removed at the sides of the slab merely falling away.

In operation a slab of clay is continuously projected through the die of the machine 1 and passes the encircling wire 28. As the slab passes the wire 28 the very smooth surface of the slab is removed, leaving the top and side surfaces of the slab (or whatever surfaces are to be exposed in the finished brick) slightly roughened. As the slab advances the rollers 13 and 18 and the rollers 25 are pressed against the surfaces of the slab which are to form the exposed surfaces of the finished brick. The surfaces of these rollers are formed with any desired configuration which is pressed into or into which is pressed the clay forming the previously roughened surfaces of the slab. After the slab has passed the ornamenting rollers it will be cut into bricks of the desired size by any of the usual cutting devices, and the bricks then burned.

Having thus described my invention, what I claim as new and desire to secure by Letters Patent of the United States is:—

1. In a brick machine device, the combination of a die adapted continuously to form a clay slab with a smooth surface, means for removing the clay forming the smooth surface, and means for depressing portions of the newly formed surface of the slab.

2. In a brick machine device, the combination of a die adapted continuously to form a clay slab with a smooth surface, means for removing the clay forming the smooth surface and forming the slab with a roughened surface, and means for continuously depressing portions of the roughened surface of the slab.

3. In a brick machine device, the combination of a die adapted continuously to form a clay slab with a smooth surface, a wire in advance of the die adapted to remove the clay forming the smooth surface and to form the slab with a roughened surface, and a roller having a roughened surface adapted to press against the roughened surface of the slab.

4. In a brick machine device, the combination of a die adapted continuously to form a rectangular clay slab with smooth top and side surfaces, a wire in advance of the die adapted to remove a thin slice of clay from the top and sides of the slab and to form the slab with roughened top and side surfaces, a roller having a roughened surface adapted to press against the roughened top surface of the slab, rollers having roughened surfaces adapted respectively to press against the roughened side surfaces of the slab, and a spring tending to press the last mentioned rollers against the sides of the slab.

5. The method of making ornamental face brick, comprising, continuously forming and advancing a clay slab with one or more smooth surfaces, removing a thin sheet of clay from a smooth surface of the slab as it advances to roughen the surface thereof, and pressing the desired ornamentation in the roughened surface of the slab by depressing portions thereof as it advances.

In witness whereof, I hereunto subscribe my name this 14th day of July, 1923.

PORTER C. FARRIS.